(12) United States Patent
Salmela (10) Patent No.: US 7,988,018 B2
(45) Date of Patent: Aug. 2, 2011

(54) SLIDING AND TILTING HEATED FLUID DISPENSER HAVING AN INSULATED PRODUCT PACKAGE ROLLER AND HOLDER

(75) Inventor: Juha K. Salmela, Citrus Heights, CA (US)

(73) Assignee: Automatic Bar Controls, Inc., Vacaville, CA (US)

( * ) Notice: Subject to any disclaimer, the term of this patent is extended or adjusted under 35 U.S.C. 154(b) by 895 days.

(21) Appl. No.: 11/860,427

(22) Filed: Sep. 24, 2007

(65) Prior Publication Data
US 2009/0078722 A1 Mar. 26, 2009

(51) Int. Cl.
*B67D 7/80* (2010.01)
(52) U.S. Cl. ............ 222/146.2; 222/101; 222/105; 222/165; 222/325; 222/381
(58) Field of Classification Search .......... 222/101, 222/102, 105, 146.2, 146.5, 160, 164, 165, 222/325, 326, 380, 381
See application file for complete search history.

(56) References Cited

U.S. PATENT DOCUMENTS

| | | | | |
|---|---|---|---|---|
| 4,133,456 A | * | 1/1979 | Corini | 222/146.5 |
| 6,016,935 A | * | 1/2000 | Huegerich et al. | 222/146.1 |
| 6,345,734 B2 | * | 2/2002 | Schalow et al. | 222/103 |
| 6,419,121 B1 | * | 7/2002 | Gutierrez et al. | 222/146.5 |
| 6,691,894 B2 | * | 2/2004 | Chrisman et al. | 222/101 |
| 6,938,801 B1 | * | 9/2005 | Reddy et al. | 222/214 |
| 7,475,795 B2 | * | 1/2009 | Faller et al. | 222/95 |
| 2008/0169309 A1 | * | 7/2008 | Kroeger | 222/146.5 |

* cited by examiner

*Primary Examiner* — J. Casimer Jacyna
(74) *Attorney, Agent, or Firm* — Kilpatrick Townsend & Stockton LLP (57) ABSTRACT

An apparatus for dispensing a flowable product from a product package through a dispensing outlet at or above a preset elevated temperature is disclosed. In one embodiment, the apparatus includes a container slide structure coupled with a first side of the container and having: a first slide member coupled with a first side of the container; a second slide member extendably coupled with the first slide member; a slide mounting bracket for connecting with a fixed surface coupled to the first slide member; a container tilt structure coupled with a first side of the container and having a: tilt member coupled with the first side of the container and the slide mounting bracket; a slot member having a slot coupled with the first side of said container; a slot engagement member slidably movable in the slot of the slot member coupled with the first side the container and the tilt member; and a pivot member coupled with the first side of the container at a lower back position of the container, enabling the tilting of the container about the pivot member from a horizontal position to a titled position, the titling being constrained by the movement of the slot engagement member in the slot of the slot member. Other embodiments disclose a roller and roller retainer mechanism; and a product package holder.

22 Claims, 6 Drawing Sheets

SLIDING AND TILTING HEATED FLUID DISPENSER HAVING AN INSULATED PRODUCT PACKAGE ROLLER AND HOLDER

BACKGROUND OF THE INVENTION

The present invention relates generally to a dispensing apparatus and, more particularly, to an apparatus for dispensing a flowable product at an elevated temperature. The flowable product includes a fluid that may or may not contain particulates, such as cheese sauces, chili, other condiments, and the like.

It is often desirable to dispense a condiment such as cheese sauce, mustard, catsup, and other flowable food products from a product container. To prevent bacterial growth in low acid food products, such products are maintained at or above an elevated temperature, typically about 140° F. or higher, after the container is opened. Often the food products are available in flexible packages or bags, and are dispensed from such packages.

One such desirable dispensing system is described in the assignees U.S. Pat. No. 7,025,230, the teachings of which are incorporated herein by reference. The systems disclosed in the '230 patent, are directed to a dispensing apparatus for dispensing a heated fluid or flowable food product from a package while maintaining the product at or above a preset elevated temperature. In one embodiment, an apparatus for dispensing a flowable product from a product package through a dispensing outlet at or above a preset elevated temperature includes a container in which to dispose the product package. The container includes a gas inlet and a gas outlet. A dispensing outlet is provided to dispense the flowable product from the product package, and is disposed adjacent the gas outlet. A pump is coupled between the product package and the dispensing outlet to pump the flowable product from the product package to the dispensing outlet. A heated gas flow controller is configured to direct a heated gas flow in the container to heat the product package, the pump, and the dispensing outlet. The heated gas flow includes gas flowing into the container via the gas inlet and gas flowing out of the container via the gas outlet adjacent the dispensing outlet.

While the systems described in the '230 patent provides many advantageous features, these systems can also face various operational challenges. One operational challenge is posed by the placement of the dispensing apparatus at an elevated counter top. Such an elevated dispenser needs to be reloaded with a product package and getting access to the interior compartment of the dispensing apparatus presents certain accessibility challenges due the dispenser being placed at an elevated counter top.

Another challenge faced by most restaurant operators is the reduction or elimination of waste. One way of reducing product waste has been to provide the food product in sealed bags or packages. While doing so will reduce evaporation and the possible contamination of the food product, it presents its own challenges. One such challenge includes the effective and efficient dispensing of the food product from the bag or package. This challenge can be analogized to the squeezing of toothpaste from a tube, where the squeezing of an acceptable amount of the product from its container to minimize product waste continues to frustrate many. These same challenges are present in case of a food product in a bag, and are even more exaggerated by other factors including the size of the product bag, lack of adequate access to the bag, and burning hazards due to elevated temperature of the bag and its contents.

BRIEF SUMMARY OF THE INVENTION

The present invention relates to an apparatus for dispensing a flowable product from a product package through a dispensing outlet at or above a preset elevated temperature. The apparatus includes a container in which to dispose the product package, the container including a gas inlet and a gas outlet; a dispensing outlet to dispense the flowable product from the product package; a pump coupled between the product package and the dispensing outlet to pump the flowable product from the product package to the dispensing outlet; a heater configured to heat air flowing into the container; means for generating a positive pressure inside the container which is higher than a pressure outside the container to cause the heated air in the container to flow adjacent the product package, the pump, and the dispensing outlet; and means for recirculating a portion of the heated air in the container to the heater.

In one embodiment, the apparatus includes a container slide structure coupled with a first side of the container and having: a first slide member coupled with a first side of the container; a second slide member extendably coupled with the first slide member; a slide mounting bracket for connecting with a fixed surface coupled to the first slide member; a container tilt structure coupled with a first side of the container and having a: tilt member coupled with the first side of the container and the slide mounting bracket. The tilt structure also includes a slot member having a slot coupled with the first side of said container; a slot engagement member slidably movable in the slot of the slot member coupled with the first side the container and the tilt member; and a pivot member coupled with the first side of the container at a lower back position of the container, enabling the tilting of the container about the pivot member from a horizontal position to a titled position, the titling being constrained by the movement of the slot engagement member in the slot of the slot member.

The container slide structure can be one of a pair container slide structures, each container slide structure being coupled to opposing parallel sides of the container.

The container tilt structure can be one of a of a pair container tilt structures, each container tilt structure being coupled to opposing parallel sides of the container.

In one aspect, the apparatus also includes a damper having a first end and a second end, the damper coupled at the first end with a damper bracket coupled with the tilt member, and coupled at the second end with an upper back side of the container. The damper stroke is restricted by movement of the slot engagement member in the slot from the cabinet's horizontal position to its titled position.

In another aspect, the damper can be one of a pair of dampers, each damper being coupled at the first end with a damper bracket coupled with a tilt member, and coupled at the second end with an upper back side of the container.

In another embodiment, the apparatus includes a product package holder coupled with an interior of the container and having a ramp member, the ramp member extending in a direction downward from a back top portion of the container toward a front bottom portion of the container near the pump, and extending in a width direction from a first side of the container to an opposing parallel second side of the container. The apparatus also includes a roller dimensioned to span the width direction of the ramp member and of sufficient weight to press down on the product package, so as to urge the product in the product package down the ramp. The apparatus also includes a pivotable roller holder dimensioned to fit in the container which has a pivot member coupled with the an internal surface of the container near a top portion of the container, the roller holder being movable about the pivot member between a normal operating position and a product loading position, the top portion of the roller holder being lower than the top portion of the container in the normal operating position, the roller holder having a first surface extending inward from a side of the roller holder, the first surface configured to urge the roller against the product package in the product loading position. The product package holder has a second surface extending inward from a side of the product package holder, the second surface being configured to receive the roller in the product loading position away from the product package.

In one aspect, the pivotable roller holder further includes a latch mechanism to positively hold the roller holder up in a latched product loading position.

In another aspect, the roller is an insulated roller.

In another aspect, the roller includes a solid metal cylinder surrounded by an insulating layer.

In another embodiment, the apparatus includes a product package holder coupled with an interior of the container; and a product package retaining member coupled with the top back portion of the product package holder, the product package retaining member configured to engage a top portion of the product package when the product package is placed on the product package holder.

In one aspect, the product package retaining member includes a pair of pins disposed near the ends of the width direction of the product package holder, the pins being configured to engage a pair of complementarily-shaped hanger holes in the top portion of the product package.

For a further understanding of the nature and advantages of the invention, reference should be made to the following description taken in conjunction with the accompanying figures. It is to be expressly understood, however, that each of the figures is provided for the purpose of illustration and description only and is not intended as a definition of the limits of the embodiments of the present invention.

BRIEF DESCRIPTION OF THE DRAWINGS

FIGS. 3A-C illustrate the product package holder.

FIG. 4A-C illustrate the roller holder unit.

FIG. 5A-C illustrate the slide and tilt structure.

FIG. 6A-C illustrate the assembled container 102.

DETAILED DESCRIPTION OF THE INVENTION

The embodiments of the present invention are related to a fluid dispenser for dispensing a flowable product from a product package through a dispensing outlet at or above a preset elevated temperature. Such an apparatus includes a container in which to dispose the product package. The container has a gas inlet and a gas outlet. The container also includes a dispensing outlet to dispense the flowable product from the product package. The dispenser also includes a pump coupled between the product package and the dispensing outlet to pump the flowable product from the product package to the dispensing outlet. The dispenser can also include a heater configured to heat air flowing into the container; and a fan for generating a positive pressure inside the container which is higher than a pressure outside the container to cause the heated air in the container to flow adjacent the product package, the pump, and the dispensing outlet. In addition, the dispenser can also include structures for recirculating a portion of the heated air in the container to the heater. Further details of such a dispenser are described the assignee's U.S. Pat. No. 7,025,230, the teachings of which are incorporated herein by reference.

Certain embodiments of the present invention are directed to various advantageous features that can be used in combination with the above-described apparatus. These various features are directed toward a slide and tilt mechanism; a roller and roller retainer mechanism; a product package holder, as well as others, each of which is described below in further detail.

Figure 1A:
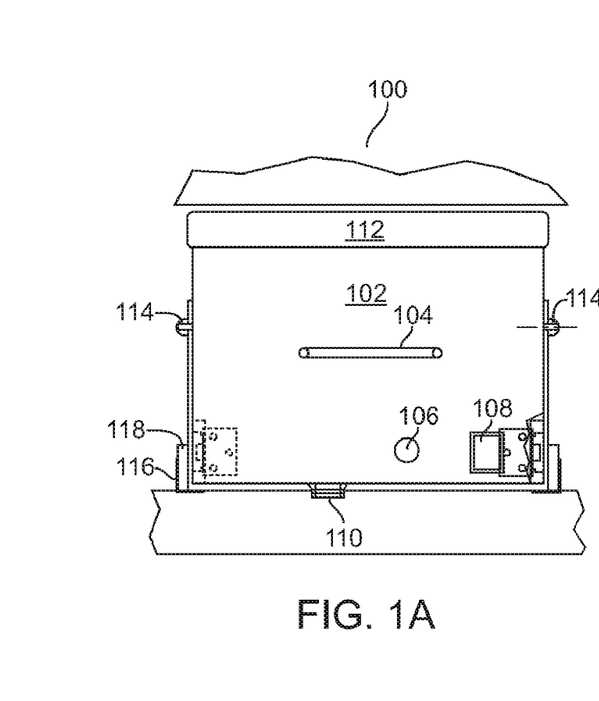
FIGS. 1A-B are exemplary diagrams illustrating a front view (FIG. 1A) and a side view (FIG. 1B) of the apparatus for dispensing a flowable product from a product package through a dispensing outlet, in accordance with an embodiment of the present invention.
Figure 1B:
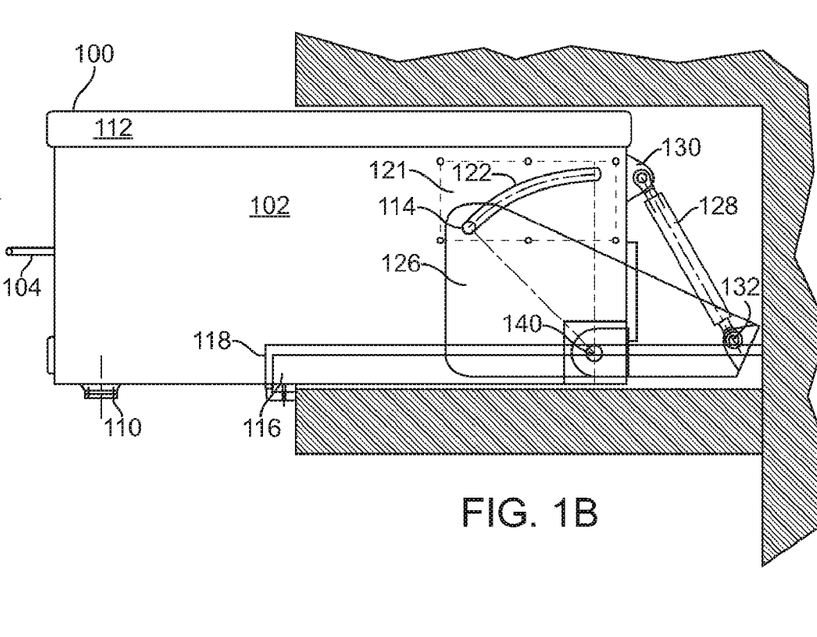

FIG. 1A is an exemplary diagram illustrating a front view of the fluid dispenser apparatus 100 for dispensing a flowable product from a product package through a dispensing outlet, in accordance with an embodiment of the present invention. FIG. 1B is an exemplary diagrams illustrating a side view of the fluid dispenser apparatus 100. FIG. 1B shows the apparatus 100 to be sitting between a bottom shelf and a top shelf (cross hatched area). It should be realized that while the apparatus, and its slide and tilt structure, lends itself to such a setup, the present apparatus is not necessarily limited for an installation in such a location. Shown in FIGS. 1A-B is the container 102 in which to dispose the product package. A handle 104 is disposed on the front of the container 102 to allow an operator to grasp the dispenser 100. The dispenser 100 includes a dispense button 106 that once activated causes a product in the product bag to be dispensed out of the dispenser outlet 110. An on/off switch 108 is also disposed in the front of the unit. Switch 108 is used to turn the dispenser on or off or to place it in its clean-in-place mode. When the dispenser is turned on, a fan and a heater are both turned on to heat the dispenser, and the pump unit is ready to dispense a heated product from the product bag and out of the dispense outlet 110. A top cover 112 is provided which is removed to get access to the interior of the container 102.

A slide structure 118 is disposed on the sides of the container 102 to allow it to be pulled out from its normal operating position when an operator pulls on the handle 104. The slide structure 118 includes a first slide member coupled with a first side of the container; and a second slide member extendably coupled with the first slide member. The slide member 116 can make use of a commercially-available drawer slide or other similar suitable slide structures. A side mounting bracket 116 for connecting with a fixed surface (e.g., shelf) is coupled to the first slide member. A container tilt structure is coupled with a first side of the container. The container tilt structure can include a tilt member 126 coupled with the first side of the container and the slide mounting bracket 116. The tilt structure also includes a slot member 121 having a slot 122 coupled with the first side of said container. The slot member 121 can be a part of the side of the container or it can be separate part connected with the side of the container. The slot member 121 functions like a bearing surface for the slot engagement member 114. The slide member also acts as a thermal insulation to thermally insulate the heated container 102 from the slide and tilt structures. The slot 122 can extends from the slot member 121 through to the matching slot in the side of the container. A slot engagement member 114 coupled with the first side the container and the tilt member is configured to slidably move in the slot 122 of the slot member. The slot engagement member 114 can be a T-bolt or similar fastener. The T-bolt extends through the slot and is secured against the slot member 121 by a nut. A pivot member 140 coupled with the first side of the container 102 at a lower back position of the container, enables the tilting of the container about the pivot member 140 from a horizontal position to a titled position, with the titling being constrained by the movement of the slot engagement member 114 in the slot 122 of the slot member 121.

The container slide structure can be one of a pair container slide structures, each container slide structure being coupled to opposing parallel sides of the container. Likewise, the container tilt structure can be one of a of a pair container slide structures, each container tilt structure being coupled to opposing parallel sides of the container.

The side and tilt structures can also include a damper 128. The damper 128 is coupled at a first end 132 with a damper bracket coupled with the tilt member 126, and coupled at a second end 130 with an upper back side of the container 102. The damper bracket can be a part of or connected with a cross member that connects the tilt member 126 at one side of the container 102 with the tilt member 126 at the other side of the container 102. The stroke of the damper 128 is restricted by the movement of the slot engagement member 114 in slot 122 from the cabinet's horizontal position to its titled position. The damper 128 can be one of a pair of dampers, each damper being coupled at the first end with a damper bracket coupled with the tilt member, and coupled at the second end with an upper back side of the container. The damper 128 is used to allow the dispenser 100 to be titled downward smoothly.

Figure 2:
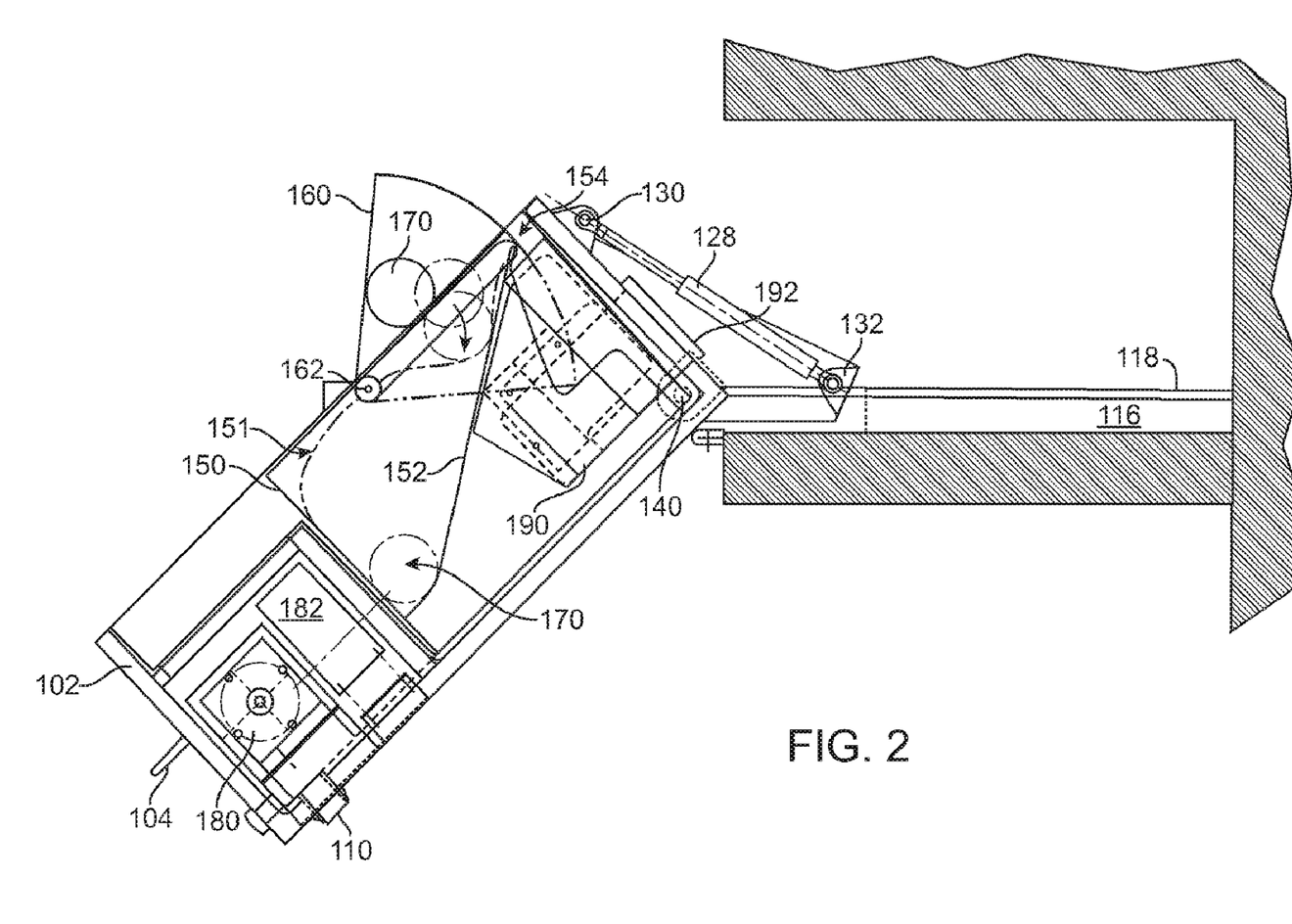
FIG. 2 is side view diagram corresponding to the apparatus of FIGS. 1A-B illustrating the apparatus in an extended and tilted position. (The right hand side of the container is shown removed).

FIG. 2 is side view diagram corresponding to the apparatus of FIGS. 1A-B illustrating the apparatus 100 in an extended and tilted position. In FIG. 2, the right hand side of the container and the top cover 112 are shown removed. As can be seen in FIG. 2, the dispenser 100 has been pulled out on the slide 116 and tilted forward from its normal horizontal and normal operational position. As can be seen in FIG. 2, a product package holder 150 is coupled with an interior of the container. The product package holder 150 has a ramp member 152 which extends in a direction downward from a back top portion of the container toward a front bottom portion of the container toward the pump 180. Located near the pump 180 is the control device 182 used to control the operation of the pump. The ramp 152 extends in a width direction from a first side of the container to an opposing parallel second side of the container. A roller 170 is dimensioned to span the width direction of the ramp 152 and is of sufficient weight to press down on a product package, so as to urge the product in the product package down the ramp 152. The fan and heater assembly 190, as well as the fan inlet 192 are shown near the rear of the dispenser. The fan inlet 192 is configured to receive a replaceable filter. The replaceable filter allows for the easy changing of the filter without having to access the interior of the dispenser. The gas outlet can be around the dispense outlet 110 as well as from vents disposed on the container's body (shown in FIG. 7).

The heater unit employs an advanced temperature control scheme that uses two thermostats. A first thermostat is used for the normal control of the unit for the heater to achieve a desired temperature. A second thermostat is used for an over temperature protection such that the heater is turned off when an over temperature set point is reached. For example, when the normal operating set point is set to 140° F., an over temperature set point can be set to a value between 150-180° F. In addition to the use of two thermostat for the heater control unit, the heater itself employs a thermal fuse to provide an additional over temperature protection for the heater device.

A pivotable roller holder 160 is dimensioned to fit in the container and has a pivot member 162 coupled with an internal surface of the container near a top portion of the container. The roller holder 160 is movable about the pivot member 162 between a normal operating position and a product loading position. The top portion of the roller holder can be flush with or lower than the top portion of the container in its normal operating position, so as not to interfere with the placement of the top cover 112 on the container 102.

Figure 4A:
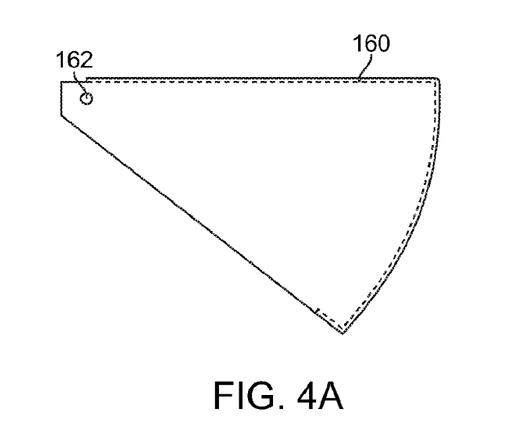
FIG. 4A illustrates a side view of the roller holder unit, and FIGS. 4B and C illustrate a top and front views thereof, respectively.
Figure 4B:
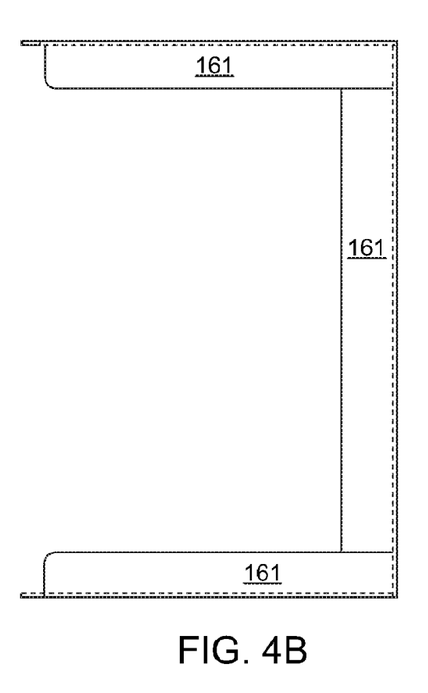
Figure 4C:
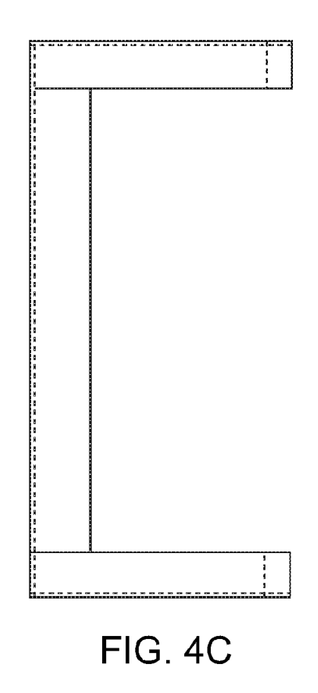

FIG. 4A-C illustrate the roller holder unit 160. FIG. 4A illustrates a side view of the roller holder unit 160, and FIGS. 4B and C illustrate a top and front views thereof, respectively. The roller holder 160 has a first surface portion 161 extending inward from a side of the roller holder. The first surface portion 161 is configured to urge the roller 170 against the product package 151 in the product loading position. The pivotable roller holder 160 can also have a latch mechanism to positively hold the roller holder 160 in a latched product loading position. The latch mechanism can include a spring-biased ball or pin connected with the roller holder 160 that engages a complementarily-shaped recess on the internal surface of the container. Alternatively, the latch mechanism can include a spring-biased ball or pin connected with the internal surface of the container that engages a complementarily-shaped recess on roller holder.

The roller 170 is of sufficient weight to urge the product in the product bag 151 down the ramp 152. The weight of the roller 170 will ensure that the product in the bag and the bag itself are efficiently squeezed down to minimize food waste. As the product package 151 empties, the roller 170 moves down the ramp. When the product package 151 is emptied, the roller 170 moves to the bottom of the ramp 152. For example, for a food bag that can weight about 7-8 lbs, the roller is also designed to weight at least 7-8 lbs. A heavier or lighter roller can be used depending on the desired operational output. As described above, the dispenser can be heated to dispense a heated product. Therefore, the interior components of the container can be hot to the touch. In order to avoid operator discomfort, the roller includes a layer of insulting material. For example, the roller can be a solid metal cylinder surrounded by an insulating layer. The insulation layer has a lower heat capacity value than that of the roller material, so that when the heating is stopped and the unit is opened, the outside surface of the roller cools faster, thus allowing an operator to roll the roller 170 up the ramp and move it up past gap 155 and place it on the surface 153, to then replace the product package (described below with reference to FIGS. 3A-C).

Figure 3A:
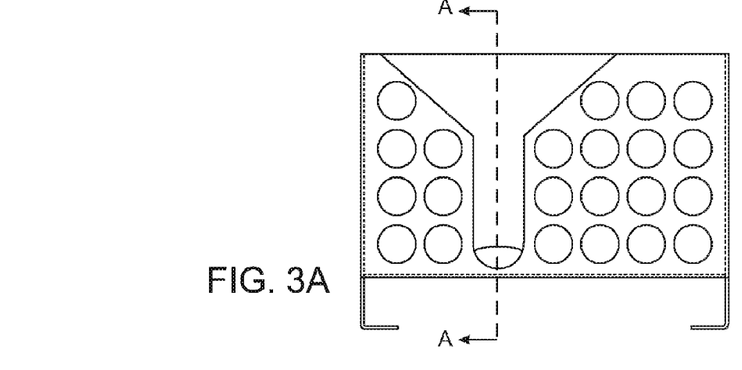
FIG. 3A illustrates a front view of the package holder.
Figure 3B:
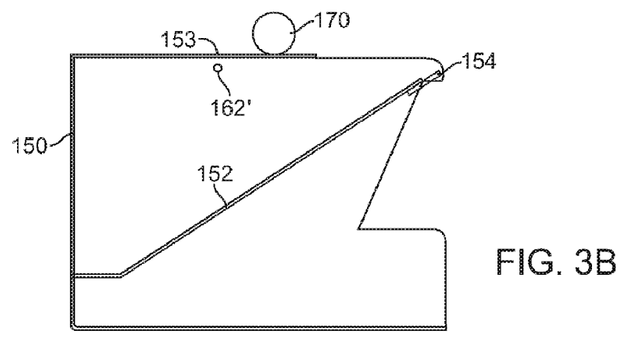
FIG. 3B illustrates section A-A of FIG. 3A.
Figure 3C:
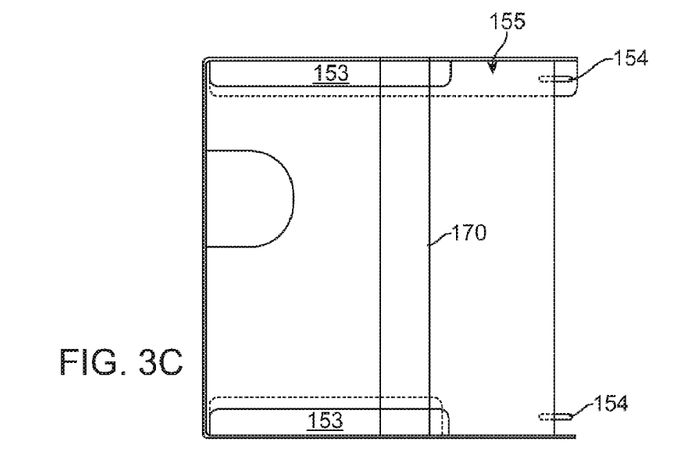
FIG. 3C shows a top view corresponding to FIG. 3B.

As described above, the product bag holder 150 includes a ramp member 152, that extends in a direction downward from a back top portion of the container toward a front bottom portion of the container near the pump, and extends in a width direction from a first side of the container to an opposing parallel second side of the container. The product package holder also includes a package retaining member 154 that is coupled with the top portion of the product package holder. The product package retaining member 154 is configured to engage a top portion of the product package 151 when the product package 151 is placed on the ramp 152. In one embodiment, the product package retaining member 154 can be a pair of pins disposed near the ends of the width direction of the ramp 152. The pins 154 are configured to engage a pair of complementarily-shaped hanger holes in the top portion of the product package 151. Alternatively, clips or other fastening members can be used as the product package retaining members.

The slide and tilt mechanism, the roller and the roller retainer mechanism, and the product package holder can be made from commonly available metal of plastic materials using known manufacturing techniques.

FIGS. 3A-C illustrate the product package holder 150. FIG. 3A illustrates a front view of the package holder 150. The array of apertures shown on the front of the package holder serves to reduce the weight of the piece as well as provide for enhanced air flow in the container 100. FIG. 3B illustrates section A-A of FIG. 3A. FIG. 3B shows the ramp member 152 as well as the package retaining members 154. Also shown in FIG. 3B is the aperture 162' for coupling the pivot member 162. FIG. 3C shows a top view corresponding to FIG. 3B. The product package holder 150 has a second flange portion 153 extending inward from a side of the product package holder. The second surface 153 is configured to receive the roller in the product loading position. This second surface 153 can be referred to as a roller holder support. The second surface 153 does not extend along the entire length of the side so as to leave a gap 155. The gap 155 allows the roller 170 to be lifted up above the product package holder 150. The roller 170 once lifted up above the product package holder 150, can be placed on the surface 153 of the product package holder.

Figure 5A:
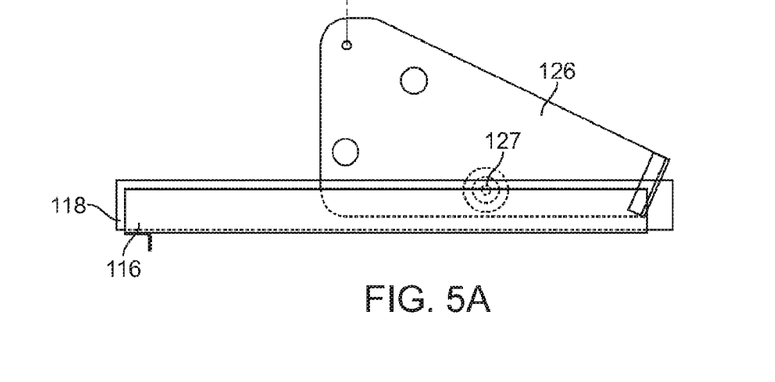
FIG. 5A illustrates a side view of the slide and tilt structure, and FIGS. 5B and C illustrate a top and front views thereof, respectively.
Figure 5B:
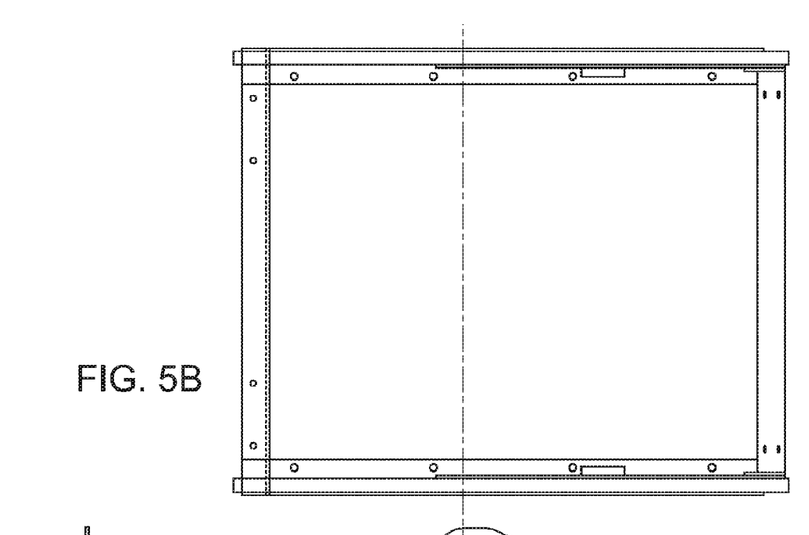
Figure 5C:
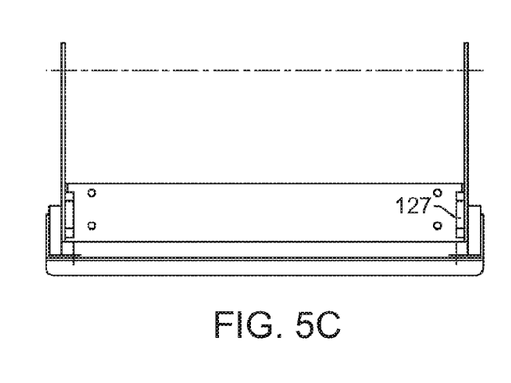

FIG. 5A-C illustrate the slide and tilt structure. FIG. 5A illustrates the tilt member 126, which may be referred to as a tilt saddle. Also shown are the slide member 118 and the slide mounting bracket 116. Also shown is a bearing housing 127 for the tilt member to enable a more smooth pivot about pivot member 140. FIGS. 5B and C illustrate a top and front views thereof, respectively.

Figure 6A:
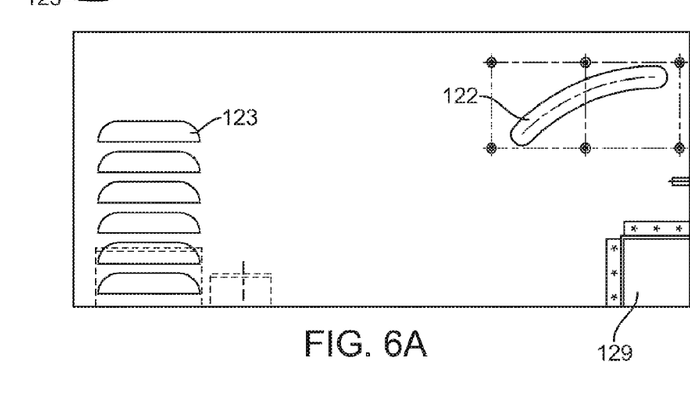
FIG. 6A illustrates a side of the container.
Figure 6B:
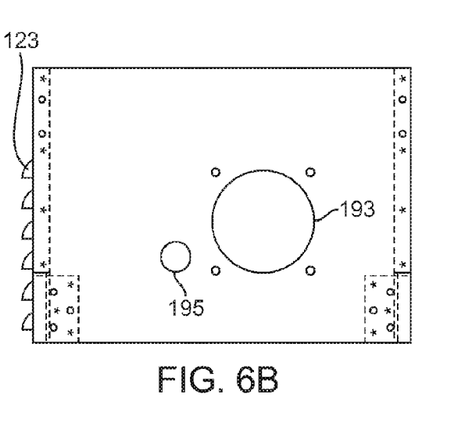
FIG. 6B shows a back view of the container.
Figure 6C:
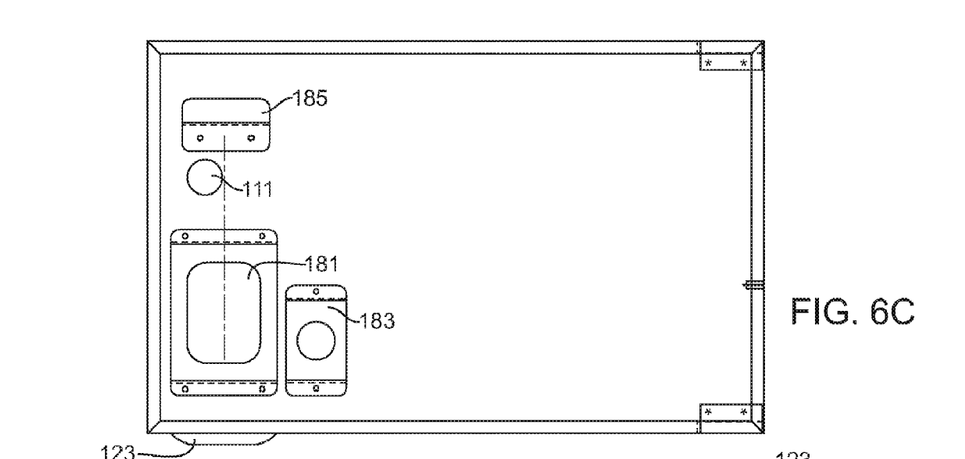
FIG. 6C illustrates a top view showing the interior of the container.

FIG. 6A-C illustrate the assembled container 102. FIG. 6A illustrates a side of the container 102. The side shown in FIG. 6A shows the slot 122 and vents 123. Apertures shown arranged around the slot 122 are dimensioned to received fasteners to couple the side with the slot member 121 described above. Also shown is member 129 that receives a bearing and is coupled with the pivot member 140. FIG. 6B shows a back view of the container 102. The back view shows apertures for the fan intake 193 and utility/power connection 195. Also shown in FIG. 6B is the vent 123. FIG. 6C shows a top view showing the interior of the container. Shown in FIG. 6C are mount 181 and support 185 for the pump and mount 183 for the controller. An aperture 111 is also shown for the dispense outlet 110. Preferably, the interior surface of the container 102 is thermally insulated. The insulation is used to affect an efficient heating for the container. The insulation is also used to keep the external surface of the unit cool enough to touch, when the unit is heated by the fan and the heater. In addition, a liner layer may also be disposed on top of the insulation layer. The liner layer can be fastened to bonded with the interior surface of the container or the insulation.

The dispenser configuration lends itself to a clean-in-place process whereby a cleaning fluid can be flowed through the dispenser for cleaning the dispenser without its disassembly. In order to clean the dispenser, switch 108 is set to the clean mode. In the clean mode, the switch 108 can be a spring-biased switch which returns to its normal position when not pressed upon. In the clean mode, the heater and the fan are turned off and the dispenser is ready for cleaning. A cleaning fluid can be placed in a bucket. A hose in fluid communication with the cleaning fluid can be connected with the pump inlet. By pressing and holding switch 108 in the clean setting, the pump will draw cleaning fluid from its supply and clean the dispensing pathway. Using the same setup, the dispenser can be rinsed and sanitized and made ready for regular dispensing.

For normal dispensing, first the operation switch 108 is set to the off position. The dispenser is pulled forward on the slide structure and allowed to tilt downward, as shown in FIG. 2. Next, the top cover 112 is removed and set aside. The roller holder 160 is raised to its product loading position. Then the roller 170 is lifted up and placed on the roller holder support (or the second surface) 153. A full product package 151 is connected with the pump inlet, the product package is rested on the ramp 152 in the product holder 150, and the product package holes are attached with the package retaining members 154. Next, the roller 170 is lifted off the supports and lowered onto the product package, allowing the roller 170 to roll downward. Next, the roller holder 160 is lowered fully and the cover 112 is placed back on. The dispenser 100 is lifted by the handle 104 to a level position and then the dispenser 100 is pushed back on the slides until it stops. The unit can then be turned on using the switch 108, and product may be dispensed by pushing button 106 is pushed to dispense the product. During the unit's normal operation, a product package is not replaced until the package is emptied and the roller 170 reaches the bottom of the ramp 152.

It should be realized that the embodiments described above are not limited for use with the above described heated fluid dispenser but can be used with any dispenser, whether heated or not heated, that uses a product package. Furthermore, the slide and tilt mechanism are can also be usable with any suitable food dispensing product, such as any of those commercially available from the assignee herein.

The above description is illustrative and is not restrictive, and as it will become apparent to those skilled in the art upon review of the disclosure, that the present invention may be embodied in other specific forms without departing from the essential characteristics thereof. For example, any of the aspects described above may be combined into one or several different configurations, each having a subset of aspects. These other embodiments are intended to be included within the spirit and scope of the present invention. The scope of the invention should, therefore, be determined not with reference to the above description, but instead should be determined with reference to the following and pending claims along with their full scope of equivalents.

What is claimed is:

1. An apparatus for dispensing a flowable product from a product package through a dispensing outlet at or above a preset elevated temperature, the apparatus comprising:
    a container in which to dispose the product package, the container including a gas inlet and a gas outlet;
    a dispensing outlet to dispense the flowable product from the product package;
    a pump coupled between the product package and the dispensing outlet to pump the flowable product from the product package to the dispensing outlet;
    a heater configured to heat air flowing into the container;
    means for generating a positive pressure inside the container which is higher than a pressure outside the container to cause the heated air in the container to flow adjacent the product package, the pump, and the dispensing outlet;

means for recirculating a portion of the heated air in the container to the heater;
a container slide structure coupled with a first side of the container and having:
a first slide member coupled with a first side of the container;
a second slide member extendably coupled with the first slide member;
a slide mounting bracket for connecting with a fixed surface coupled to the first slide member;
a container tilt structure coupled with a first side of the container and having a:
tilt member coupled with the first side of the container and the slide mounting bracket;
a slot member having a slot coupled with the first side of said container;
a slot engagement member slidably movable in the slot of the slot member coupled with the first side the container and the tilt member; and
a pivot member coupled with the first side of the container at a lower back position of the container, enabling the tilting of the container about the pivot member from a horizontal position to a titled position, the titling being constrained by the movement of the slot engagement member in the slot of the slot member.

2. The apparatus of claim 1, further comprising a damper having a first end and a second end, the damper coupled at the first end with a damper bracket coupled with the tilt member, and coupled at the second end with an upper back side of the container.

3. The apparatus of claim 2, wherein the damper stroke is restricted by movement of the slot engagement member in the slot from the container's horizontal position to its titled position.

4. The apparatus of claim 3, wherein the damper is one of pair of dampers, each damper being coupled at the first end with a damper bracket coupled with the tilt member, and coupled at the second end with an upper back side of the container.

5. The apparatus of claim 1, wherein the container slide structure is one of a pair container slide structures, each container slide structure being coupled to opposing parallel sides of the container.

6. The apparatus of claim 1, wherein the container tilt structure is one of a of a pair container tilt structures, each container tilt structure being coupled to opposing parallel sides of the container.

7. The apparatus of claim 1, further comprising:
a product package holder coupled with an interior of the container; and
a product package retaining member coupled with the top back portion of the product package holder, the product package retaining member configured to engage a top portion of the product package when the product package is placed on the product package holder.

8. The apparatus of claim 7, wherein the product package retaining member comprises a pair of pins disposed near the ends of the width direction of the product package holder, the pins being configured to engage a pair of complementarily-shaped hanger holes in the top portion of the product package.

9. The apparatus of claim 1, further comprising:
a heater controller having two temperature controller controllers, wherein a first temperature controller is used to set a normal desired operating temperature and a second temperature controller is used to set an over temperature set point.

10. The apparatus of claim 9, further comprising a thermal fuse coupled with the heater.

11. The apparatus of claim 9, further comprising a removable and replaceable filter disposed on an external surface of container, said filter being in fluid communication with said means for generating a positive pressure.

12. An apparatus for dispensing a flowable product from a product package through a dispensing outlet at or above a preset elevated temperature, the apparatus comprising:
a container in which to dispose the product package, the container including a gas inlet and a gas outlet;
a dispensing outlet to dispense the flowable product from the product package;
a pump coupled between the product package and the dispensing outlet to pump the flowable product from the product package to the dispensing outlet;
a heater configured to heat air flowing into the container;
means for generating a positive pressure inside the container which is higher than a pressure outside the container to cause the heated air in the container to flow adjacent the product package, the pump, and the dispensing outlet;
means for recirculating a portion of the heated air in the container to the heater;
a product package holder coupled with an interior of the container having a ramp member, the ramp member extending in a direction downward from a back top portion of the container toward a front bottom portion of the container adjacent the pump, and extending in a width direction from a first side of the container to an opposing parallel second side of the container;
a roller dimensioned to span the width direction of the ramp member and of sufficient weight to press down on the product package, so as to urge the product in the product package down the ramp; and
a pivotable roller holder dimensioned to fit in the container and having a pivot member coupled with an internal surface of the container near a top portion of the container, the roller holder being movable about the pivot member between a normal operating position and a product loading position, the top portion of the roller holder being lower than the top portion of the container in the normal operating position,
the roller holder having a first surface extending inward from a side of the roller holder, the first surface configured to urge the roller against the product package in the product loading position,
the product package holder having a second surface extending inward from a side of the roller holder, the second surface configured to receive the roller in the product loading position away from the product package.

13. The apparatus of claim 12, wherein the pivotable roller holder further comprises a latch mechanism to positively hold the roller holder in a latched product loading position.

14. The apparatus of claim 12, wherein the roller is an insulated roller.

15. The apparatus of claim 12, wherein the roller comprises a solid metal cylinder surrounded by an insulating layer.

16. The apparatus of claim 12, further comprising a product package retaining member coupled with the top back portion of the product package holder, the product package retaining member configured to engage a top portion of the product package when the product package is placed on the product package holder.

17. The apparatus of claim 16, wherein the product package retaining member comprises a pair of pins disposed near the ends of the width direction of the product package holder, the pins being configured to engage a pair of complementarily-shaped hanger holes in the top portion of the product package.

18. The apparatus of claim 12, further comprising a heater controller having two temperature controllers, wherein a first temperature controller is used to set a normal desired operating temperature and a second temperature controller is used to set an over temperature set point.

19. The apparatus of claim 18, further comprising a thermal fuse coupled with the heater.

20. The apparatus of claim 18, further comprising a removable and replaceable filter disposed on an external surface of container, said filter being in fluid communication with said means for generating a positive pressure.

21. The apparatus of claim 12, wherein the roller is freely manually manipulable between an operating position, where it is disposed on the ramp member, and a reload position, external to the apparatus.

22. The apparatus of claim 12, wherein the roller is bearingless.

* * * * *